United States Patent [19]

Detroit

[11] Patent Number: 5,041,153
[45] Date of Patent: * Aug. 20, 1991

[54] LIGNOSULFONATE TREATED FERTILIZER PARTICLES

[75] Inventor: William J. Detroit, Schofield, Wis.

[73] Assignee: Daishowa Chemicals Inc., Rothschild, Wis.

[ * ] Notice: The portion of the term of this patent subsequent to Jul. 11, 2006 has been disclaimed.

[21] Appl. No.: 383,973

[22] Filed: Jul. 21, 1989

Related U.S. Application Data

[63] Continuation-in-part of Ser. No. 24,044, Mar. 10, 1987, Pat. No. 4,846,871.

[51] Int. Cl.$^5$ .............................. C05F 5/00; C05D 1/00; C05C 1/00; C05C 5/00
[52] U.S. Cl. .............................................. 71/25; 71/34; 71/53; 71/60; 71/63; 71/64.05; 71/64.12; 71/35
[58] Field of Search ...................... 71/1, 23, 25, 26, 31, 71/34, 35, 51, 53, 58, 59, 60, 63, 64.05, 64.12

[56] References Cited

U.S. PATENT DOCUMENTS

| | | | |
|---|---|---|---|
| 4,587,358 | 5/1986 | Blouin | 364/3 |
| 4,676,821 | 6/1987 | Gullett et al. | 71/64.12 |
| 4,846,871 | 7/1989 | Detroit | 71/25 |

OTHER PUBLICATIONS

Socha, CA 101(25):229365z, "Anti-caking Surface Treatment of Granular Fertilizers", 1984.
Bartos, CA 100(5):33718b, "Optimization of ... Fertilizers", 1983.

*Primary Examiner*—Ferris H. Lander

[57] ABSTRACT

Synthetic inorganic chemical fertilizers are treated with lignosulfonate to harden and provide anti-caking and anti-dusting properties to the fertilizer particles. The fertilizer/lignosulfonate mixture includes up to about 5.0% by weight lignosulfonate on fertilizer. An improved method of treating inorganic fertilizers with lignosulfonate is also disclosed.

12 Claims, No Drawings

LIGNOSULFONATE TREATED FERTILIZER PARTICLES

CROSS REFERENCE TO RELATED APPLICATION

This application is a continuation-in-part of application Ser. No. 07/024,044 filed Mar. 10, 1987, now U.S. Pat. No. 4,846,871, July 11, 1989.

BACKGROUND OF THE INVENTION

The present invention relates to fertilizers, and more particularly to inorganic chemical fertilizers treated with lignosulfonate to harden and give anti-caking and anti-dusting properties to fertilizer particles.

Synthetic chemical inorganic fertilizers such as ammonium phosphates, ammonium nitrates, potassium nitrates, potassium chlorides, potassium sulfates, calcium phosphates and many others are well known fertilizers. Methods of manufacturing these inorganic fertilizers as well as methods of processing the fertilizers into particles via prill and/or granulation techniques are also well known. The resulting fertilizer particles, however, exhibit several undesirable characteristics. First, such particles tend to cake when stored and transported in bulk such that the initial free flowing particles change to a solid, substantially integral mass. Secondly, such particles easily break into smaller particles resulting in a substantial amount of dust being created when handled, transported and when eventually applied to the soil.

In order to overcome the above disadvantages, the prior art has taught a number of conditioning agents which may be added to the fertilizer during processing to harden and give anti-caking and anti-dusting properties to fertilizer particles. For example, anti-caking properties have been imparted to fertilizer particles by utilizing clay, talc, surfactants, or a combination of these three conditioners, to coat the particles. Additionally, various oils are sprayed on the particles for controlling dust. Also, a phosphoric acid-boric acid compound known under the trademark "PERMALENE" and available from Mississippi Chemical, has been utilized in phosphate production as a hardening agent.

It is also known to add 0.1% to 0.5% by weight of formaldehyde to urea during urea manufacturing to overcome the above noted disadvantages. The following patents discuss the reaction of formaldehyde with urea to form urea-formaldehyde products: U.S. Pat. Nos. 3,112,343; 4,160,782; and 4,204,053. Health and safety considerations, however, have severely limited the use of formaldehyde in fertilizer products, and in fact formaldehyde is not widely accepted for use as a conditioning agent in the preparation of urea or other fertilizers. Urea has also been treated with 0.1% to 5% by weight of lignosulfonates as shown in U.S. Pat. No. 4,587,358. It is not, however, known heretofore to utilize lignosulfonate with other synthetic inorganic chemical fertilizers.

SUMMARY OF THE INVENTION

A synthetic inorganic chemical fertilizer selected from the group consisting of ammonium phosphates, ammonium nitrates, potassium nitrates, potassium chlorides, potassium sulfates, calcium phosphates and mixtures thereof, is treated with a lignosulfonate to harden the fertilizer particles and give anti-caking and anti-dusting properties to the fertilizer. The lignosulfonate may be utilized with various inorganic fertilizers and may be incorporated into various fertilizer manufacturing processes such as granulation and crystallization, i.e. prill, systems to impart the above advantageous properties to fertilizers produced in solid particulate forms, for direct application to soil.

The addition of lignosulfonate to the above noted inorganic fertilizers results in harder particles less susceptible to breakage and formation of fines, and gives anti-caking and anti-dusting properties in one step without the need for any secondary or additional conditioners. The substitution of lignosulfonates for materials such as formaldehyde not only reduces the cost of the fertilizer product, but also eliminates any health and safety considerations in that lignosulfonates are approved for use as additives in animal feed products.

The fertilizer manufacturing process may incorporate up to about 5.0% by weight lignosulfonate with about 0.05% to about 0.7% preferred. Below these preferred levels, hardness is lowered due to insufficient lignosulfonate for binding while above the preferred dosage, hardness is lowered presumably through a diluant effect.

DESCRIPTION OF THE PREFERRED EMBODIMENT

In preparing the lignosulfonate treated fertilizer of the present invention, the first step is to select a desired lignosulfonate and homogeneously mix the lignosulfonate with an inorganic fertilizer during fertilizer production. Up to about 5.0% by weight lignosulfonate may be added to the fertilizer with about 0.05% to about 0.7% preferred. 0.05% is the preferred practical lower limit since below this dosage, there is an inadequate hardness increase due to insufficient lignosulfonate for binding, and 0.7% is believed to be the practical upper limit since above this dosage hardness once again decreases which is presumably due to a diluent effect.

As used herein, the term "fertilizer" is used in its broad, general sense to mean a substance that is used to supply minerals to both plants and animals. Therefore, fertilizers include substances used to make soil more fertile as well as substances used as mineral supplements in animal feeds. The synthetic inorganic chemical fertilizers utilized in the present invention may be selected from the commonly known fertilizers consisting of ammonium phosphates, ammonium nitrates, potassium nitrates, potassium chlorides, potassium sulfates, calcium phosphates, and mixtures thereof. All of the above fertilizers as well as their methods of production are commonly known and need not be described in detail herein.

As used herein, the term "Kraft lignin" has its normal connotation, and refers to the substance which is typically recovered from alkaline pulping black liquors, such as are produced in the Kraft, soda and other well known alkaline pulping operations. The term "sulfonated lignin", as used in the specification, refers to the product which is obtained by the introduction of sulfonic acid groups into the Kraft lignin molecule, as may be accomplished by reaction of the Kraft lignin with sulfite or bisulfite compounds, so that Kraft lignin is rendered soluble in water. As used herein, the term "sulfite lignin" refers to the reaction product of lignin which is inherently obtained during the sulfite pulping of wood, and is a principle constituent of spent sulfite liquor. The term "lignosulfonate" $(LS)_3$ encompasses not only the sulfite lignin, but also the sulfonated lignin herein above described. Any type of lignosulfonate i.e. hardwood, softwood, crude or pure may be employed. For example, calcium lignosulfonates, sodium lignosulfonates, ammonium lignosulfonates, modified lignosulfonates, and mixtures or blends thereof may all be utilized herein. Lignosulfonates are available from numerous sources, in either aqueous solution or dried powder forms. For example, Daishowa Chemicals Inc. sells lignosulfonates under the trade designations "Lignosol" and "Norlig HP" which are appropriate for use in the present invention.

In present fertilizer prill production, a fertilizer generally at 70% solids concentration in water is heated in evaporators to about 285° F. to remove substantially all the water. The molten fertilizer is then injected as droplets to an air cooling tower where crystalline fertilizer is formed as a hard prill or bead used for shipment. With the present process, up to about 5.0% by weight lignosulfonate may be added to the 70% fertilizer solution prior to heating with 0.05% to 0.7% preferred. With loading over 0.7% hardness decreases presumably through a diluant effect, and with loading under 0.05% insufficient lignosulfonate is present for binding. The lignosulfonate is soluble in the molten fertilizer and solidifies with the fertilizer when cooled in the air cooling tower. The lignosulfonate is the ingredient that provides the desired advantages for the fertilizer and once the molten fertilizer and lignosulfonate are crystalized it is believed that the lignosulfonate serves to encase or entrap the fertilizer to harden and give anti-caking and anti-dusting properties to the fertilizer particles. Examples are shown herein where fertilizer strength has been increased from about 180 psi to about 780 psi depending upon lignosulfonate dosage. Lignosulfonate in either powder or liquid form may be utilized.

The following examples are given as being illustrative of the advantages of the present invention.

EXAMPLE I 0.4% by weight Norlig HP was added to an 83% ammonium nitrate solution at elevated temperature to form a homogeneous solution. This solution was then evaporated to 98+% molten ammonium nitrate and formed into plates and crystallized. Hardness of the crystal plate was measured with an ACME penetrometer and calculated to pounds per square inch resistance to breakage. The pressure shown below is the average of four plate measurements.

|  | Lbs. Pressure for Breakage | Calc. PSI |
|---|---|---|
| Ammonium Nitrates Crystal Plate No Additive | 116 | 4646 |
| Ammonium Nitrate Crystal Plate 0.4% Norlig HP Additive | 172 | 6880 |

The above data clearly indicates that the addition of lignosulfonate to ammonium nitrate yielded a crushing strength or hardness that was much greater than untreated ammonium nitrate. In fact, the above example showed a 48% increase in strength.

EXAMPLE II

Ground monoammonium phosphate (MAP) (16-200-+Mesh) was stirred with 30% water containing lignosulfonate and oven dried at 105° C. The resulting thin sheets of MAP representing granule formation were crushed using an ACME penetrometer. Results are shown below and indicate 0.4% of lignosulfonate (Norlig A) more than doubled the crushing strength of MAP.

| HARDENER FOR MONOAMMONIUM PHOSPHATE | |
|---|---|
| Norlig A % | Crushing Strength psi |
| 0 | 280 |
| 0.2 | 510 |
| 0.4 | 600 |
| 1.0 | 520 |

EXAMPLE III

Norlig HP (low foam) was added to diammonium phosphate (DAP) and the mix dried as would occur in a commercial granulation procedure. DAP plates were formed and tested for hardness using an ACME penetrometer. Results were as follows:

| % Norlig HP Solids | Hardening (psi, ACME Penetrometer) |
|---|---|
| 0 | 180 |
| 0.2 | 390 |
| 0.4 | 320 |
| 0.6 | 780 |
| 0.8 | 500 |
| 1.0 | 340 |

These results indicate an optimum dosage of approximately 0.05% to 0.7% Norlig HP solids on DAP. Below that, hardness is lowered due to insufficient product for binding. Above that dosage, hardness is lowered presumably through a diluant effect. Visual observation noted that the incorporation of Norlig HP into DAP exhibited anti-caking and anti-dusting properties as well as hardening.

EXAMPLE IV

A modified lignosulfonate was added to potassium nitrate, potassium chloride and potassium sulfate, and test plates were prepared as in Example III. Results were as follows:

| Product | % LSO$_3$ | HARDNESS ACME Penetrometer (psi) | % Increase |
|---|---|---|---|
| Potassium Nitrate | 0 | 20 | — |
|  | 5.0 | 140 | 700 |
| Potassium Chloride | 0 | 40 | — |
|  | 5.0 | 230 | 575 |
| Potassium Sulfate | 0 | 50 | — |
|  | 5.0 | 490 | 880 |

The results indicate that up to 5.0% by weight modified lignosulfonate may be utilized to increase hardness of inorganic fertilizers.

EXAMPLE V

In a typical process for making dicalcium phosphate, a slurry of 400 mesh limestone and concentrated phosphoric acid is fed into a pug mill to produce approximately 24 tons/hr. of rough product. In the case of monocalcium phosphate, additional dry limestone is also added to the mill.

In both cases, about 100 tons/hr. of recycle material (fines, including crushed oversized, and product) is also fed into the mill. These variables together give a moisture content in the mill of 5-7%. From the pug mill, rough product is fed into a cocurrent drum dryer. Residence time in the dryer is about 12 minutes. From the dryer, the still rough product is sent to an elevator for transfer to the screen room. Here fines (−65 mesh) and oversize (+14 mesh) are removed and final product, less recycle, is sent to storage.

Approximately 0.25% by weight Norlig HP 1 was sprayed into the end of the pug mill during a dicalcium phosphate run. Samples of the resulting product were taken at approximately 20 and 40 minutes into the run. The results of the analysis of these samples are indicated below. A significant decrease in fines was observed in both samples. The amount of 65 mesh material was also less. Overall, the amount of final product present in the samples was up and the distribution of material within the allowable range was improved.

| Mesh Size | Wt % Retained on Screen | | |
|---|---|---|---|
| | Control | HP 1 Spray Treated | |
| | | 20 Minutes | 40 Minutes |
| 14 | 11.9 | 10.7 | 9.9 |
| 12 | 3.4 | 3.0 | 3.3 |
| 20 | 10.0 | 8.7 | 10.3 |
| 28 | 19.6 | 20.2 | 22.5 |
| 42 | 32.6 | 37.0 | 35.7 |
| 65 | 16.1 | 15.4 | 12.5 |
| −65 | 6.4 | 5.0 | 5.2 |

EXAMPLE VI

A second trial in a dicalcium phosphate process as described in Example V was performed utilizing a dosage of about 0.1% by weight Norlig HP 1 sprayed onto the product. Spraying began at 10:30 a.m. and samples were analyzed at 11:00 a.m., 12:00 noon and 1:00 p.m. The results are shown below

| Screen Mesh | Wt % Retained |
|---|---|
| Control Data | |
| 12 | 21.4 |
| 14 | 4.4 |
| 20 | 11.2 |
| 28 | 22.2 |
| 42 | 22.8 |
| 65 | 12.5 |
| −65 | 5.5 |
| 11:00 A.M. Data | |
| 12 | 22.6 |
| 14 | 4.1 |
| 20 | 8.7 |
| 28 | 18.2 |
| 42 | 30.0 |
| 65 | 11.9 |
| −65 | 4.5 |
| 12:00 Noon Data | |
| 12 | 19.1 |
| 14 | 4.3 |
| 20 | 9.9 |
| 28 | 20.7 |
| 42 | 32.6 |
| 65 | 10.0 |
| −65 | 3.4 |
| 1:00 P.M. Data | |
| 12 | 17.1 |
| 14 | 4.1 |
| 20 | 10.8 |
| 28 | 23.3 |
| 42 | 31.4 |
| 65 | 10.0 |
| −65 | 3.3 |

After 30 minutes, the 11:00 a.m. data showed an immediate reduction in fines in the unscreened product from 5.5% to 4.5%. The 12:00 noon sample showed a further decrease in the amount of fines in the unscreened product (down to 3.4%). In addition to this, a decrease in the amount of oversize material was also observed (from 22.6% to 19.1%). The 1:00 p.m. sample showed that the amount of fines was down to 3.3% and the amount of oversize was down an additional 2% to 17.1%. In summary, the data shows that during spray treatment with 0.1% Norlig HP 1:

(1) fines were down some 40% (from 5.5 to 3.3%)
(2) oversize was down some 20% (from 21.4 to 17.1%)
(3) product (i.e. −14−+65 mesh material) was up about 9% (from 73.1 to 79.6%); it appears from the data that most of the increase is in the −28−+42 mesh range.

At 1:00 p.m. the dosage was increased to 0.16% Norlig HP 1. Unfortunately, the plant was forced to shut down shortly thereafter, and this trial was ended. Before the trial ended, however, a sample of the final product was obtained, and the results of the analysis of this sample are shown below.

Results of Final Product Screen Analysis

| Results of Final Product Screen Analysis DiCal Trial Spray | | |
|---|---|---|
| Screen Mesh | Cummulative % Retained | Wt % Retained |
| 12 | 12.5 | 12.5 |
| 14 | 48.7 | 36.2 |
| 20 | 78.4 | 29.7 |
| 28 | 96.9 | 18.5 |
| 42 | 99.89 | 2.99 |
| 65 | 99.95 | 0.06 |
| −65 | 100.00 | 0.05 |

EXAMPLE VII

Another trial in the dicalcium phosphate (DAP) process as described in Example V was performed utilizing dosages of about 0.069% and 0.15% by weight Norlig HP 1 sprayed onto the product. The crush strength and attrition (break-up to fines) evaluations are shown below.

| Sample No. | DAP TEST RESULTS | | | | |
|---|---|---|---|---|---|
| | HP-1 DOSAGE (gals/ton) | % HP Solids on DAP Solids | Crush Strength % | % Attrition | % Lower Fines |
| R-192-3 Control-Oil | 0 | — | 431 | 1.56 | — |
| R-192-1 (Norlig) | 0.25 | 0.069 | 596 | 0.56 | 64 |

| Sample No. | HP-1 DOSAGE (gals/ton) | DAP TEST RESULTS % HP Solids on DAP Solids | Crush Strength % | % Attrition | % Lower Fines |
|---|---|---|---|---|---|
| | | -continued | | | |
| R-192-2 (Norlig) | 0.57 | 0.157 | 480 | 0.66 | 58 |

The results indicate that the usage of very small amounts, even as little as 0.05% by weight lignosulfonate, may be utilized to increase hardness of inorganic fertilizers.

The following procedure is utilized in obtaining the hardness or crushing strength data referred to above and reported in Examples I through VII. In this procedure the fertilizer being tested is melted, slurried or dissolved in a small metal dish. A predetermined amount of conditioner or lignosulfonate e.g. Norlig HP, is added and the two are thoroughly mixed to form a consistent mixture or solution. The system is then cooled and dried, giving crystal plates or granules suitable for crushing. These plate or granule segments are crushed using an ACME penetrometer to obtain a measure of the relative crushing strength of the various conditioners. The penetrometer is used with a 0.1 in.$^2$ area spindle. Pounds of force are read from a gauge. Pounds per square inch crushing strength is calculated by multiplying the force figure times 10. In the screening test, visual observation is employed to determine whether a conditioner that increases granule or plate hardness also imparts anti-caking and anti-dusting properties. More accurate anti-caking and anti-dusting evaluations may be performed separately by long-term storage or accelerated storage tests.

It is clear from the above Examples that the hardness as well as the anti-caking and anti-dusting properties of synthetic inorganic chemical fertilizers has increased dramatically when a lignosulfonate is employed therewith.

The lignosulfonate that provides the advantageous properties of the present invention may also be utilized with ammonium nitrate, potassium nitrate, potassium sulfate, potassium chloride, ammonium phosphate and calcium phosphate fertilizers produced in solid particulate form by conventional granulation methods.

For example, when conventionally producing granular ammonium phosphate, phosphoric acid is neutralized with ammonia in a series of ammoniation reaction tanks where the heat of reaction evaporates a part of the water introduced with the acid. The extent of ammoniation is controlled to yield a slurry composition ranging from monoammonium phosphate to about two-thirds diammonium phosphate, depending on the grade of product desired. This slurry flows to a pugmill or blunger in which it is granulated by mixing with recycled product fines. The granules are then dried and screened to provide a product fraction and a finer recycle fraction. Recycle ratios in the order of 8:1 are required for proper control of granulation. In one variation of the process, a rotary drum granulator is substituted for the blunger. Products made in this manner contain 11% N and 21% P, predominantly monoammonium phosphate; and 16% N and 21% P, about one-third monoammonium and two-thirds diammonium phosphate. Other grades such as one containing 16% N and 8.7% P and another with 13% N and 17% P may be made by adding sulfuric acid to the ammoniators, in which case the product contains ammonium sulfate. In still another variation, unfiltered extract from a phosphoric acid plant is used to produce lower grades that contain calcium sulfate.

Diammonium phosphate containing 18% N and 20.1% P is also made by a process in which phosphoric acid is neutralized with ammonia in a rotary drum granulator. Heated air and dry recycled fines are introduced in the granulator to reduce the moisture content to the proper level for granulation. The gases leaving the granulator are scrubbed with the incoming acid. The product is dried and then screened.

An alternate process for a material containing 18% N and 20.1% P also uses a rotary granulation drum. Phosphoric acid is neutralized in a prereactor with anhydrous ammonia to an $NH_3$:$H_3PO_4$ mole ratio of about 1.3, a point near the maximum solubility of the system. The slurry thus produced is fed to the granulator along with recycled fines. Additional ammonia is added in the granulation step to give a mole ratio of about 2, a point of minimum solubility. The excess ammonia required to drive the reaction to diammonium phosphate is recovered by scrubbing the exhaust gases with the incoming acid before it is fed to the prereactor. The product from the granulator is dried and screened. In addition to the material containing 18% N and 20.1% P, a large variety of grades rich in diammonium phosphate can be conventionally produced by neutralizing with ammonia-ammonium nitrate solutions rather than anhydrous ammonia, substituting sulfuric acid for part of the phosphoric acid, or adding various solid fertilizer ingredients to the ammoniator.

Ammonium nitrate may be conventionally produced in granular form substantially as described by the above processes by initially starting with the neutralization of nitric acid with ammonia in the ammoniation reaction tanks. Similarly, potassium nitrate may be conventionally produced in granular form from potassium chloride and sodium nitrate while ammonium phosphate may be conventionally produced in granular form from ammonia and phosphoric acid.

Calcium phosphates are conventionally produced in numerous well known methods. For example, dicalcium phosphate is prepared from calcium chloride ($CaCl_2$) and disodium phosphate ($Na_2HPO_4$).

In any of the above fertilizer granulation processes, up to about 5.0% lignosulfonate by weight may be added to the fertilizer, and it is preferred to add 0.05% to 0.7% by weight lignosulfonate in the granulation process. The lignosulfonate in either liquid or solid form may be incorporated in the granulation process in the reaction tanks, in the recycled fines, or directly in the granulators. Preferably, the lignosulfonate is incorporated in the recycled fines and is sprayed onto the particles within the granulators where it aids in building the size of the granules being formed therein. The hardness of the resultant fertilizer granules is increased to thus provide stronger fertilizer granules having improved anti-caking and anti-dusting properties.

Various modes of carrying out the invention are contemplated as being within the scope of the following claims particularly pointing out and distinctly claiming the subject matter regarded as the invention.

I claim:

1. A composition of matter, consisting essentially of an admixture of a fertilizer selected from the group consisting of ammonium nitrate, ammonium phosphate, potassium nitrate, potassium sulfate, potassium chloride, calcium phosphate and mixtures thereof, and from 0.05% up to about 5.0% by weight of a lignosulfonate such that the hardness anti-caking and anti-dusting properties of the fertilizer are increased.

2. The composition of claim 1 wherein said lignosulfonate comprises about 0.05% to about 0.7% by weight of said admixture.

3. The composition of claim 1 wherein said lignosulfonate is selected from the group consisting of sulfite lignin and sulfonated lignin.

4. The composition of claim 1 wherein said lignosulfonate is obtained from the pulping of hardwoods.

5. The composition of claim 1 wherein said lignosulfonate is obtained from the pulping of softwoods.

6. A method of treating a fertilizer to improve the fertilizer's hardness, anti-caking and anti-dusting properties, consisting essentially of the steps of:

preparing an admixture of from 0.05% up to about 5.0% by weight of a lignosulfonate and a fertilizer selected from the group consisting of ammonium nitrate, ammonium phosphate, potassium nitrate, potassium sulfate, potassium chloride, calcium phosphate and mixtures thereof; and processing said admixture into a particulate form.

7. The method of claim 6 wherein said step of processing involves producing granules and said lignosulfonate is sprayed onto the fertilizer.

8. The method of claim 6 wherein said step of processing involves producing prill and said lignosulfonate is mixed with molten fertilizer prior to cooling.

9. The method of claim 6 wherein said lignosulfonate comprises from about 0.05% to about 0.7% by weight of the admixture.

10. The method of claim 6 further including the step of selecting a lignosulfonate from either a sulfite lignin or sulfonated lignin prior to preparing the admixture.

11. The method of claim 10 wherein said lignosulfonate is obtained from the pulping of hardwoods.

12. The method of claim 10 wherein said lignosulfonate is obtained from the pulping of softwoods.

* * * * *